May 25, 1954
G. JACOBI ET AL
2,679,408
COUPLING DEVICE
Filed Sept. 16, 1950
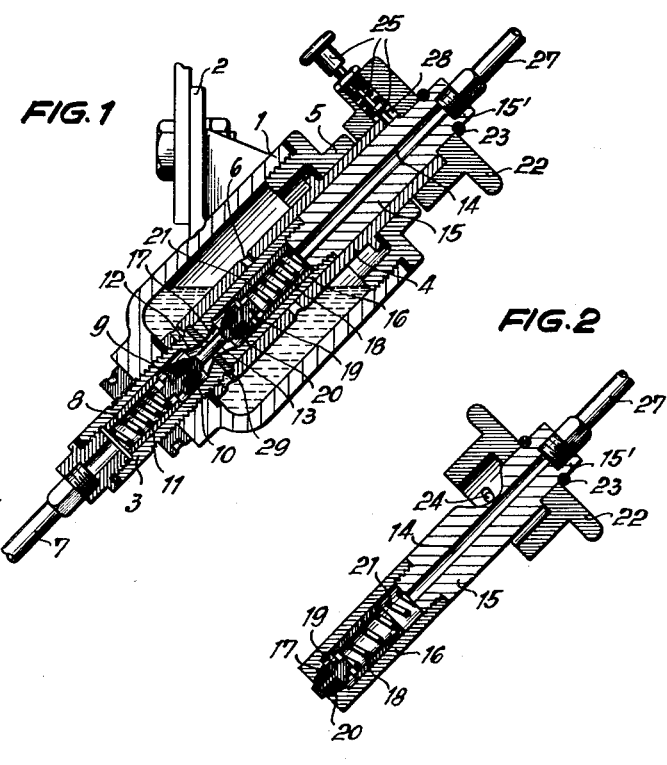
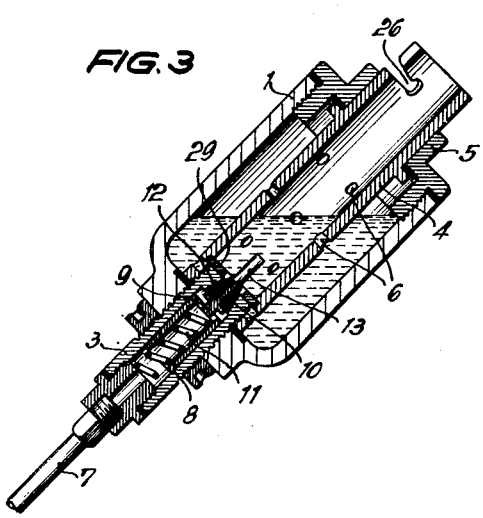
INVENTORS:
GUSTAV JACOBI AND
ANTON KOENEMANN
BY:

Patented May 25, 1954

2,679,408

UNITED STATES PATENT OFFICE 2,679,408

COUPLING DEVICE

Gustav Jacobi, Minden, Westphalia, and Anton Könemann, near Minden, Westphalia, Germany Application September 16, 1950, Serial No. 185,252

Claims priority, application Germany September 19, 1949

3 Claims. (Cl. 284—18)

This invention relates to a coupling for hydraulic pressure pipes, more particularly for the connection of the oil pressure brake pipe of a motor vehicle to that of its trailer, of the type in which both coupling members comprise spring-acted check valves which in case of a closed condition of the coupling are interacting to keep each other open and on disconnection close automatically by the spring action. The couplings of this kind so far known have the disadvantage that on coupling it may easily happen that air gets into the oil pressure pipe, whereby as is well known the safety of operation of the whole braking system is endangered.

It is an object of the present invention to provide means in a coupling of the type referred to, for avoiding this drawback.

With this and further objects in view according to the present invention a coupling member is arranged in a casing containing a brake fluid and connectable to a pressure pipe, in such a manner that the check valve is below the level of the brake fluid. Provided within the casing is a guide sleeve for the plug member, which sleeve is formed with connecting holes to the casing chamber.

Due to this construction and arrangement the two check valves are always opened below the level of the brake fluid present in the coupling case so that penetration of air into the brake line system is safely prevented.

In motor vehicles the coupling case is preferably fastened to the truck or motor lorry in the vicinity of the trailer coupling, i. e. in such a way that the longitudinal axis of the coupling case is inclined by about 45° inclination to the vehicle. The plug member on the contrary is connected to a flexible pressure pipe of the braking system of the trailer and after the disconnection of the coupling is held in a support provided at the trailer.

Other and further objects, features and advantages of the invention will be pointed out hereinafter and appear in the appended claims forming part of the application.

In the accompanying drawings a now preferred embodiment of the invention is shown by way of illustration and not by way of limitation.

Fig. 1 is a vertical longitudinal section through the coupling in its operative position, Fig. 2 is a longitudinal section of the plug member, and Fig. 3 is a longitudinal section through the coupling case.

Similar reference numerals denote similar parts in the different views.

Referring now to the drawing in greater detail, it will be seen that the coupling case 1 is provided with a cast-on fixing flange 2 forming an angle of about 45° with the longitudinal axis of the case 1 and serving for securing the case on a motor truck. The bottom of the coupling case 1 is provided with a threaded bore into which is screwed a valve casing 3 provided with a complementary external thread. Screwed onto the end of the valve casing 3 protruding into the coupling case 1 is a cylindrical sleeve or guide tube 4 serving for guiding the plug member (Fig. 2) and having its upper end positioned in a central bore of the closing rim 5 of the case. The guide sleeve 4 is provided with lateral recesses or holes 6 so that the braking fluid is permitted to communicate within the guide sleeve with the braking fluid in the casing 1, the latter acting as a reservoir for the liquid therein as shown in the drawings.

Disposed in the valve casing 3 to which a pressure pipe or fluid line 7 is connected in known manner, is a guide cylinder 8 for the carrier 9 of the valve head 10 consisting of rubber or a similar material, members 9 and 10 forming a movable valve member. Moreover, a compression spring 11 is disposed in the guide cylinder 8, which compressing spring acts permanently onto the carrier 9 of the valve head 10. In the embodiment illustrated the seat 12 of the valve head 10 is provided in the front end of the valve casing 3. The parts 3 and 8—12 thus form a check valve means. The carrier 9 of the valve head 10 is provided at its outer front side with a stem or pin member 13 of such a length that it protrudes in an open position of the valve by some millimeters through the valve seat 12 into the interior of the guide sleeve 4.

The plug member to be inserted into the sleeve 4 consists substantially of a cylindrical body 15 provided with a central bore 14 and having a valve casing 16 secured to its lower end, which valve casing like the valve casing 3 is provided with a conical valve seat 17. Disposed in the valve casing 16 is a guide cylinder 18 for the carrier 19 of the valve head 20, which valve head 20 like the valve head 10 consists of rubber or a similar material, the members 19 and 20 forming a movable valve member. The valve head carrier 19 like the carrier 9 is under permanent action of a compression spring 21 mounted in the guide cylinder 18. Thus, the parts 16—21 form a second check valve means. The pin member 13 forms a control means for automatically opening both valve means when they are arranged as shown in Fig. 1.

Arranged on the upper reduced end 15' of the body 15 is a cap member 22 secured against sliding off from its carrier by a spring ring 23. This cap member 22 is provided with a fixed stud 24 inwardly projecting from the side wall of member 22, and with a spring-loaded catch pin 25 which is longitudinally slidable in a radial direction. In the coupling operation the fixed stud 24 is introduced into an angular or bayonet slot 26 provided at the upper end of the guide sleeve 4, while a bore 28 is provided in the sleeve 4 for the catch pin 25.

The plug member thus constructed is connected to the oil pressure braking system of a truck trailer preferably by means of a flexible pipe 27.

The washer 29 disposed in the guide sleeve 4 in the operative position serves for mutually packing the valve casings 3 and 16.

The operation of the new coupling is very simple. In a disconnected state the springs 11 and 21 will force the valve heads 10 and 20 onto their seats 12 and 17, thus establishing an absolutely tight closure of the two pipes 7 and 27. The casing 1 and the interior of the guide sleeve 4 are filled with braking fluid to such an extent that the bottom valve 9, 10, 11, 12, 13 is disposed well below the level of the braking fluid.

On coupling the plug member is introduced into the sleeve 4 of the casing 1, displacing the braking fluid from the sleeve 4 through the hole 6 into the space outside of the sleeve 4. During the plugging-in operation the valve stem 13 strikes against the carrier 19 of the valve head 20 so that on further moving-in both valve heads are lifted from their seats and both valves mutually keep each other in an open condition. In the end position the washer 29 is fixedly urged between the front faces of the valve casings 3 and 16 by the bayonet fixing or swivel connection 24, 26 of the cap 22, thus establishing a tight connection between the brake piping of the truck and that of the trailer. The catch pin 25 during operation prevents undesired loosening or release of the swivel connection 24, 26.

The coupling must not be disconnected before the pressure is removed from the braking system. On loosening the cap member 22, the valve heads 10 and 20 are again urged upon their seats by action of the springs 11 and 21, i. e. before the valve of the plug member is disposed outside of the braking fluid, so that even during the disconnecting operation no air is permitted to enter into the oil pressure braking system.

On disconnection the sleeve 4 is closed at its top by a cap (not shown) which is designed like the cap 22 but does not have an opening in the cover.

It should be noted that packing rings 29', 30, 31, 32, 33 of a conventional type are provided between the various parts as shown. The lower valve casing 3 is locked in its position in the case 1 by a lock nut 34 and the pipe 7 is tightly secured to the valve casing 3 by a threaded sleeve 35.

It is also possible to provide guide members of another kind for the valves and the plug member. Moreover, it is possible to arrange the casing 1 so as to be vertical or inclined at an angle of less than 45° in relation to the vertical.

It will be understood that the field of application of the new coupling is not limited to motor vehicles but it can be used with good success wherever it is intended to couple hydraulic pressure pipes so as to be easily disconnectable while safely preventing the access of air.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. A coupling for releasably interconnecting a pair of liquid carrying lines, having a first member comprised of a reservoir disposed angularly to a horizontal plane, a liquid in said reservoir, a guide tube mounted in said reservoir, said tube having a smaller cross section than said reservoir, a valve casing secured to said reservoir and said guide tube adjacent the bottom of the reservoir and in communication with the guide tube, means on the end of said casing remote from said reservoir for attaching a liquid line thereto, valve means in said casing adjacent the end remote from said attaching means, perforations in the guide tube, some of said perforations being disposed beneath the surface of the liquid; a second member telescopically received in said guide tube, means on said guide tube and means on said second member releasably connecting the two members together, valve means mounted in the end of said second member adjacent said valve casing, means on said valve means in said members holding the valve means in open position when said members are connected, spring means in said casing and said second member urging the respective valve means toward closed position when said members are disconnected, the valve means in said members being disposed beneath the surface of the liquid when said members are connected and means on the end of said second member remote from said valve means adapted to connect the member to a liquid line.

2. A coupling for releasably interconnecting a pair of liquid carrying lines, having a first member comprised of a reservoir adapted to be disposed angularly to a horizontal plane, said reservoir being adapted to contain a liquid, a guide tube mounted in said reservoir, said tube having a smaller cross section than said reservoir, a valve casing secured to said reservoir and said guide tube adjacent the bottom of the reservoir and in communication with the guide tube, means on the end of said casing remote from said reservoir for attaching a liquid line thereto, valve means in said casing adjacent the end remote from said attaching means, perforations in the guide tube adjacent said casing so that the perforations will be located beneath the surface of a liquid in said reservoir; a second member telescopically received in said guide tube, means on said guide tube and means on said second member releasably connecting the two members together, valve means mounted in the end of said second member adjacent said valve casing, means on said valve means in said members holding the valve means in open position when said members are connected, spring means in said casing and said second member urging the respective valve means toward closed position when said members are disconnected, the valve means in said members being adapted to be disposed beneath the surface of a liquid in said reservoir when said members are connected and means on the end of said second member remote from said valve means adapted to connect the member to a liquid line.

3. A coupling for releasably interconnecting a pair of liquid carrying lines, having a first member comprised of a reservoir disposed angularly to a horizontal plane, a liquid in said reservoir, a guide tube mounted in and concentric with said reservoir, said tube being of smaller diameter than said reservoir and having a portion extended beyond the top thereof, a valve casing secured to said reservoir and said guide tube adjacent the bottom of the reservoir and in communication with the guide tube, means on the end of said casing remote from said reservoir for attaching a liquid line thereto, valve means in said casing adjacent the end remote from said attaching means, perforations in the portion of the guide tube disposed within said reservoir, some of said perforations being disposed beneath the surface of the liquid; a second member telescopically received in said guide tube, means on said guide tube and means on said second member releasably connecting the two members together, valve means mounted in the end of said second member adjacent said valve casing, means on said valve means in said members holding the valve means in open position when said members are connected, spring means in said casing and said second member urging the respective valve means toward closed position when said members are disconnected, the valve means in said members being disposed beneath the surface of the liquid when said members are connected and means on the end of said second member remote from said valve means adapted to connect the member to a liquid line.

References Cited in the file of this patent

UNITED STATES PATENTS

| Number | Name | Date |
|---|---|---|
| 755,325 | Soutar | Mar. 22, 1904 |
| 1,334,503 | Olson | Mar. 23, 1920 |
| 1,515,026 | Frauenfelder | Nov. 11, 1924 |
| 2,543,589 | Newcomb | Feb. 27, 1951 |